(12) United States Patent
Hall et al.

(10) Patent No.: US 11,310,124 B2
(45) Date of Patent: Apr. 19, 2022

(54) HOSTING PROVIDER RECOMMENDATION

(71) Applicant: Ent. Services Development Corporation LP, Houston, TX (US)

(72) Inventors: Eric Hall, Pontiac, MI (US); Jacob Gar Barshaw, Pontiac, MI (US)

(73) Assignee: Ent. Services Development Corporation LP, Houston, TX (US)

( * ) Notice: Subject to any disclaimer, the term of this patent is extended or adjusted under 35 U.S.C. 154(b) by 239 days.

(21) Appl. No.: 15/475,628

(22) Filed: Mar. 31, 2017

(65) Prior Publication Data

US 2018/0287892 A1 Oct. 4, 2018

(51) Int. Cl.
*H04L 12/24* (2006.01)
*H04L 41/5019* (2022.01)
*H04L 67/1001* (2022.01)
*H04L 67/51* (2022.01)
*H04L 43/091* (2022.01)
*H04L 41/50* (2022.01)

(52) U.S. Cl.
CPC ...... *H04L 41/5019* (2013.01); *H04L 67/1002* (2013.01); *H04L 41/5035* (2013.01); *H04L 41/5096* (2013.01); *H04L 67/16* (2013.01)

(58) Field of Classification Search
None
See application file for complete search history.

(56) References Cited

U.S. PATENT DOCUMENTS

| | | | |
|---|---|---|---|
| 9,240,025 B1* | 1/2016 | Ward, Jr | G06F 11/3006 |
| 2004/0162901 A1* | 8/2004 | Mangipudi | H04L 41/5025 |
| | | | 709/225 |
| 2005/0120226 A1* | 6/2005 | Hartel | G07F 7/1008 |
| | | | 713/185 |
| 2009/0070443 A1* | 3/2009 | Vanderhook | G06Q 30/02 |
| | | | 709/222 |
| 2010/0332262 A1 | 12/2010 | Horvitz et al. | |
| 2011/0145094 A1 | 6/2011 | Dawson et al. | |
| 2012/0179824 A1* | 7/2012 | Jackson | G06F 9/5072 |
| | | | 709/226 |
| 2013/0111033 A1* | 5/2013 | Mao | G06F 9/5072 |
| | | | 709/226 |
| 2014/0047084 A1* | 2/2014 | Breternitz | H04L 67/1008 |
| | | | 709/221 |
| 2014/0278623 A1* | 9/2014 | Martinez | G06Q 10/06 |
| | | | 705/7.12 |
| 2016/0224377 A1* | 8/2016 | Farhan | G06F 9/505 |
| 2017/0180459 A1* | 6/2017 | Frank | H04L 41/5048 |
| 2019/0287026 A1* | 9/2019 | Calmon | H04L 9/0819 |

* cited by examiner

*Primary Examiner* — Dhairya A Patel
(74) *Attorney, Agent, or Firm* — Polsinelli PC

(57) ABSTRACT

According to examples, an apparatus includes a processor and a memory on which is stored machine readable instructions. The instructions may cause the processor to acquire technical characteristics of a client workload, access client policies, determine an infrastructure to implement the client workload based upon the acquired technical characteristics of the client workload, determine, based upon the determined server sizing and the accessed client policies, a recommended hosting provider that is to host the client workload, and output the determined server sizing and the recommended hosting provider.

18 Claims, 4 Drawing Sheets

HOSTING PROVIDER RECOMMENDATION

BACKGROUND

Cloud computing generally provides users access to computing resources and data storage through a network, such as the Internet. The computing resources and data storage are typically provided to the clients by hardware equipment in data centers that are linked together over the network to form a "cloud." The hardware equipment, such as servers, data storage devices, routers, switches, etc., are typically linked together through high-speed communications and management software guides the collective actions of the hardware equipment. Additionally, cloud service providers charge fees to users to manage access to the computing resources and data storage.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
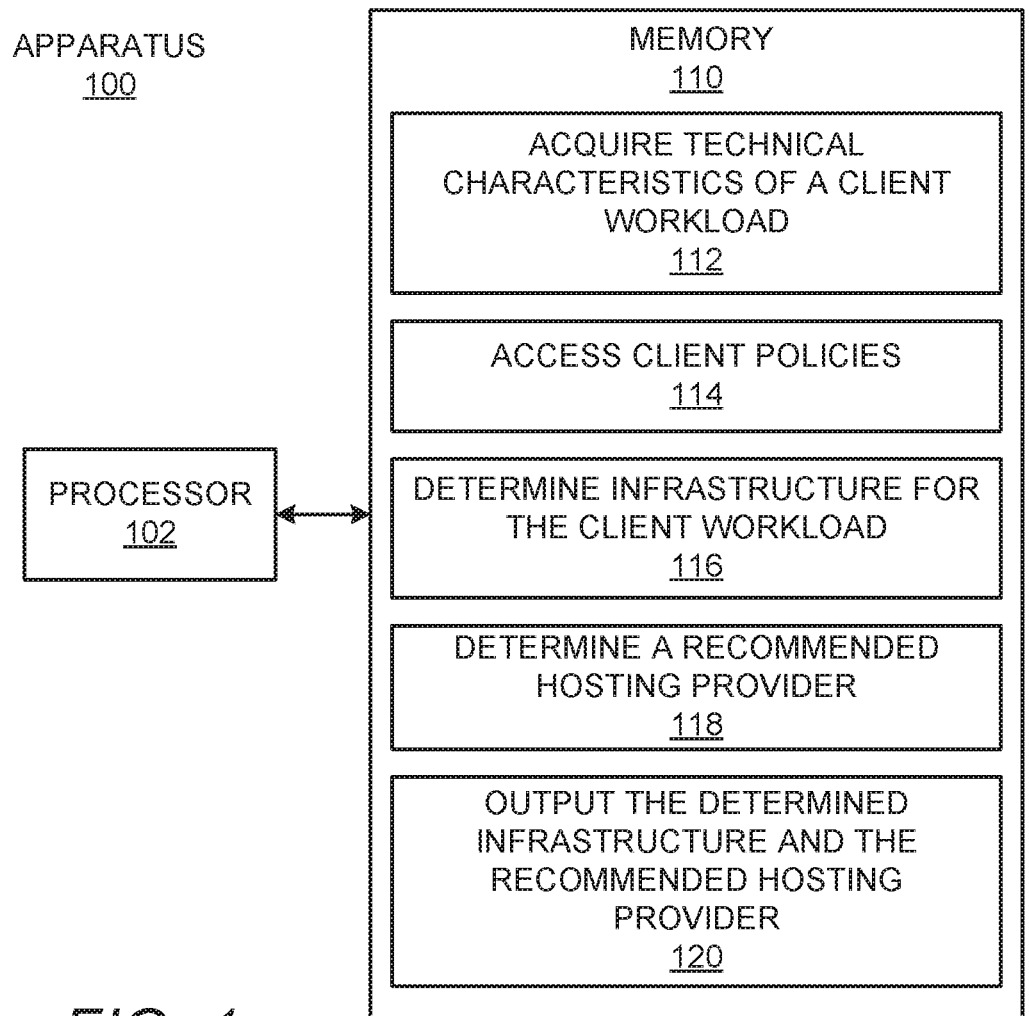
FIG. 1 shows a block diagram of an example apparatus that may determine a recommended hosting provider to host a client workload.

In conventional workload placement services, clients typically instruct the workload placement services of the sizes of the servers that they require and the workload placement services determine which cloud service provider is able to meet the required server sizes. Additionally, conventional workload placement services consider any available cloud service provider in determining which one to select to host a workload, for instance, based upon whether the cloud service provider is able to provide the required servers and the prices for providing the servers. Conventional workload placement services therefore do not consider existing rules that the clients may wish to have enforced with the placement of the workloads.

In contrast to conventional workload placement services, disclosed herein are apparatuses and methods for determining an infrastructure for a client workload based upon technical characteristics of the client workload. The technical characteristics of the workload may include the intended audience of the workload, the location at which the audience of the workload is located, the type of data contained in the workload, the number of transactions per second, criticality of the workload, data size, etc. As such, instead of requiring that the client determine the infrastructure that is able to perform the workload, the apparatuses and methods disclosed herein may determine the infrastructure for the workload based upon the technical characteristics of the workload.

The apparatuses and methods disclosed herein may also determine a recommended hosting provider for the client workload based upon the determined infrastructure and client policies. The client policies may include limitations on which type of hosting provider may be selected to host the workload based upon the technical characteristics of the workload. Generally speaking, the limitations may be based upon various rules that the client may seek to have enforced during hosting of the workload. Additionally, the recommended hosting provider may be a hosting provider from a set of candidate hosting providers, in which the candidate hosting providers are hosting providers with which the client has contractual agreements to be able to receive services. As such, the apparatuses and methods disclosed herein may determine a recommend hosting provider with which the client already has contractual agreements that are able to meet the limitations set forth in the client policies.

The apparatuses and methods disclosed herein may also consider the terms contained in the contractual agreements, e.g., costs, reliability guarantees, etc., in determining the recommended hosting provider. Thus, for instance, the apparatuses and methods disclosed herein may determine a recommended hosting provider that may not only meet the determined infrastructure and the client policies, the recommended hosting provider may also provide the services at the lowest cost, the highest reliability level, etc. According to examples, the information used to determine the recommended hosting provider may be contained in one or more tables, e.g., spreadsheet tables, on which technical characteristics of new workloads as well as various other information may be inputted and updated. As such, for instance, the information may be generated and updated without requiring coding.

Through implementation of the apparatuses and methods disclosed herein, clients may be provided with the correct fit and correct placement of workload to thus minimize the risk to clients of over-sizing the infrastructure required to perform their workloads. The apparatuses and methods disclosed herein also provide clients with a recommendation for a correct hosting provider that does not violate the client's policies, e.g., corporate, regulatory, or the like. In other words, through implementation of the apparatuses and methods disclosed herein, an infrastructure and hosting provider to host a client workload that meets a number of technical and policy requirements may be determined in a relatively efficient manner and without significant use of client resources.

According to examples, because the apparatuses disclosed herein determine the infrastructure for the client workload and a recommended hosting provider to host the workload for the client, the client may not need to determine the infrastructure or the hosting provider to select to host the workload. Instead, the client may provide information that the client may have available, such as the technical characteristics of the workload (e.g., the size or transaction volume of the workload, etc.), the hosting providers with whom the client has contractual agreements, the scope of services within those contractual agreements (which may be less than what the hosting provider may offer in-general), the client business and technical policies, and the terms of the contractual agreements. The apparatuses disclosed herein may accurately determine the infrastructure of the hardware components and software that are able to meet the technical characteristics of the workload. For instance, the apparatuses disclosed herein may accurately determine a minimal infrastructure for the workload and may provide the determined minimal infrastructure to the client. The apparatuses disclosed herein may also recommend a hosting provider that is able to supply the determined infrastructure while meeting various policies. Additionally, the apparatuses disclosed herein may further provide an estimated cost for the services provided by the recommended hosting provider, provide notification to the requestor of the estimate, and track approval of the estimate prior to ordering services from the hosting provider.

The client workload may thus be hosted by an appropriate hosting provider on a correct infrastructure, e.g., correctly sized server or servers, correct types of disaster recovery and data backup, correct software, etc. In other words, a client may be prevented from over-buying/over-sizing the infrastructure to perform their workload. The workload may thus efficiently be implemented on a correctly provisioned infrastructure that match the characteristics of the workload, which may reduce or minimize unnecessary placement of the workload on extra servers, which frees the extra servers to perform other workloads and reduces or minimizes costs associated with performing the workloads. In other words, the apparatuses and methods disclosed herein may result in a technological improvement in that the client workloads may be performed/hosted in an efficient manner, e.g., in terms of energy efficiency, server usage efficiency, etc. Additionally, the apparatuses disclosed herein may ensure greater availability of workload and less business disruption by enforcing policies that mandate use of appropriate best-practice technologies to prevent business disruptions. In other words, the apparatuses disclosed herein may enforce implementation of high-availability solutions for critical workloads, which may otherwise be optional or non-existent with conventional workload placement techniques.

Before continuing, it is noted that as used herein, the terms "includes" and "including" mean, but are not limited to, "includes" or "including" and "includes at least" or "including at least." The term "based on" means, but is not limited to, "based on" and "based at least in part on."

With reference first to FIG. 1, there is shown a block diagram of an example apparatus 100 that may determine a recommended hosting provider to host a client workload. It should be understood that the apparatus 100 depicted in FIG. 1 may include additional components and that some of the components described herein may be removed and/or modified without departing from a scope of the apparatus 100 disclosed herein.

The apparatus 100 may include a processor 102 that may control operations of the apparatus 100. The apparatus 100 may be a computing device such as a personal computer, a laptop computer, a smartphone, a server computer, a tablet computer, or the like. In a particular example, the apparatus 100 is a cloud-based server. The processor 102 may be a semiconductor-based microprocessor, a central processing unit (CPU), an application specific integrated circuit (ASIC), a field-programmable gate array (FPGA), and/or other hardware device.

The apparatus 100 may also include a memory 110 that may have stored thereon machine readable instructions 112-120 (which may also be termed computer readable instructions) that the processor 102 may execute. The memory 110 may be an electronic, magnetic, optical, or other physical storage device that contains or stores executable instructions. The memory 110 may be, for example, Random Access memory (RAM), an Electrically Erasable Programmable Read-Only Memory (EEPROM), a storage device, an optical disc, and the like. The memory 110, which may also be referred to as a computer readable storage medium, may be a non-transitory machine-readable storage medium, where the term "non-transitory" does not encompass transitory propagating signals.

The processor 102 may fetch, decode, and execute the instructions 112 to acquire technical characteristics of a client workload (which is also referenced herein simply as a workload). According to examples, the workload may be an application (e.g., a website) that multiple users are to access over a network, such as the Internet. The acquired technical characteristics of the workload may include some or all of, a location or locations of the users of the workload, a type of user of the workload, the number of transactions per second, a type of data contained in the workload, a transaction volume of the workload, an environment in which the workload is to be used, a desired backup size of the workload, a backup retention length, a type of software platform of the workload, a desired primary drive size for the workload, a desired database data size for the workload, etc. The location of the users may include, for instance, an identification of the country or countries from which the users are to access the workload. The type of user of the workload may include, for instance, whether the user is a consumer or a business. The type of data may include, for instance, whether the data is a trade secret, personally identifiable data, financial data, or the like. The environment in which the workload is to be used may include, for instance, whether the workload is to be used in a production environment or a development environment. The type of software platform may include, for instance, whether the software platform is a standard software platform of a specialized software platform.

The processor 102 may acquire the technical characteristics of the workload from the client for whom the workload is to be performed. For instance, the client may input the technical characteristics of the workload through an interface, such as a web-based interface or portal. In addition or in other examples, the processor 102 may access a database on which the technical characteristics of the workload have been stored to acquire that information. For instance, the database may store one or more tables on which the technical characteristics as well as other information may be contained.

The processor 102 may fetch, decode, and execute the instructions 114 to access client policies. The client policies may include limitations on which type of hosting provider may be selected to host the workload based upon the technical characteristics of the workload. The different types of hosting providers may include a public cloud-based hosting provider, a managed private cloud (MPC), an information technology operations (ITO) provider, or the like. The different types of hosting providers may also include multiple public cloud-based hosting providers, multiple managed private clouds (MPCs), virtual or physical hosting compute platforms, or the like. The virtual or physical computing platforms may be of any operating system type on which the workload may operate.

Generally speaking, the client policies may include limitations directed to technical rules and/or business rules. In some examples, the business rules may override the technical rules for instance if there is a conflict between a business rule and a technical rule. The client and/or an operator of the apparatus 100 may set the client policies and may include limitations directed to compliance with government regulations, compliance with client-specific privacy and security practices, compliance with contract terms and conditions with the hosting provider, efficiencies in having the workload hosted in a particular type of hosting provider, technical limitations of the hosting providers, etc. By way of particular example, a client policy may include a limitation that a workload whose audience location is Europe must be placed with a hosting provider that is located in Europe to comply with European regulatory requirements. As another example, a client policy may include a limitation that a workload whose users are primarily consumers be placed with a first type of hosting provider (e.g., a public cloud-based hosting provider) and that a workload whose users are primarily businesses be placed with a second type of hosting provider (e.g., an ITO).

As another particular example, a client policy may include a limitation that a workload whose backup size is less than a certain size be placed on a first type of hosting provider (e.g., a MPC) and that a workload whose backup size is greater than the certain size be placed on a second type of hosting provider (e.g., an ITO). As a further example, a client policy may include a limitation that a workload whose database data size is less than a particular size be placed on a first type of hosting provider (e.g., a leveraged database pool) and that a workload whose database data size is greater than a certain size be placed on a second type of hosting provider (e.g., an ITO).

The client policies may also define how the workload is to be hosted by a hosting provider. For instance, a client policy may include a limitation that a workload whose primary drive size is less than a certain size be placed on a first type of hosting provider using virtual resources (e.g., a virtual hosting compute platform), that a workload whose primary drive size is between the certain size and a second certain size be placed on the first type of hosting provider using physical resources (e.g., a physical hosting compute platform), and that a workload whose primary drive size is greater than the second certain size be placed on a second type of hosting provider (e.g., an virtual hosting compute platform). By way of another example, licensing terms may also be enforced by requiring a certain size or platform be utilized for a given type of technology, such as placing all of a certain vendor database software on a particular type of server (e.g. a physical server) to minimize licensing costs.

The processor 102 may access the client policies from the client for whom the workload is to be performed. For instance, the client may input the client policies through an interface, such as a web-based interface or portal. In addition or in other examples, the processor 102 may access a database on which the client polices have been stored to access that information. Moreover, the client policies may be hierarchically arranged such that the different client policies are weighted differently from each other. The client may assign different weights to the client policies.

The processor 102 may fetch, decode, and execute the instructions 116 to determine an infrastructure that is to support the client workload based upon the acquired technical characteristics of the client workload, such as the platform on which the workload operates, the multiple components which make up the total workload, etc. The processor 102 may determine the infrastructure, e.g., the server sizing, physical vs. virtual services, data recovery options, backup options, software to be implemented, etc., that is able to perform or host the client workload while meeting the technical characteristics of the client workload. For instance, the processor 102 may determine that a server having certain specifications, a certain number of servers having certain specifications, etc., are able to minimally meet requirements of the client workload as identified by the acquired technical characteristics.

The processor 102 may also determine the infrastructure based upon the client policies, which may include policies for the infrastructure determination. By way of example, the processor 102 may determine a first infrastructure in an instance in which the client workload is in a production environment and a second infrastructure in an instance in which the client workload is in a development environment. In this example, the processor 102 may determine a larger server sizing if the workload is to be used in a production environment than in a development environment so that there is sufficient availability, better fault tolerance, etc., when the workload is to be used in a production environment.

The processor 102 may fetch, decode, and execute the instructions 118 to determine a recommended hosting provider for placement of the client workload. That is, the processor 102 may determine the recommended hosting provider based upon the determined infrastructure and the accessed policies. In addition, the processor 102 may determine the recommended hosting provider from candidate hosting providers. The candidate hosting providers may be hosting providers with which the client has contractual agreements in place to receive services from the hosting providers. The client may have contractual agreements with multiple cloud-based hosting providers, MPC's, ITO's, etc. These contracts may specify a set of services, which may be a sub-set of all services the hosting provider offers, or customized services for the client. According to examples, the apparatus 100 may accommodate incorporating such contractual terms into the determination of the recommended hosting provider.

According to examples, the processor 102 may analyze various factors in determining which of the candidate hosting providers to recommend to host the workload. The various factors may pertain to the determined infrastructure for the client workload as determined from the acquired technical characteristics of the workload and the accessed client policies. The various factors may also pertain to technical limitations of the candidate hosting providers, e.g., the processor 102 may be provided with information pertaining to the technical capabilities of the candidate hosting providers. The technical capabilities of the candidate hosting providers may include information pertaining to the types of servers, the types of operating systems, the types of virtual machine algorithms, etc., that the candidate hosting providers have. The various factors may further pertain to the terms contained in the contractual agreements between the client and the candidate hosting providers. That is, for instance, the processor 102 may determine the recommended hosting provider to be a hosting provider from the candidate hosting providers that is able to provide the determined infrastructure, while meeting the provisions set forth in the client policies. In instances in which multiple candidate hosting providers are able to provide the determined infrastructure but the client policies conflict with respect to the multiple candidate hosting providers, the processor 102 may determine which of the client policies has a higher weighting and may select the candidate hosting provider that meets the higher weighted client policy to recommend.

Additionally, the processor 102 may determine the recommended hosting provider to be the hosting provider that is able to provide the determined infrastructure, while meeting the provisions set forth in the client policies, and while providing the most favorable contract terms, e.g., the lowest agreed upon pricing for the provided services, the highest level of availability, the highest level of reliability, etc. Traditional cloud "broker" systems assume comparisons based on the published capabilities and costs of cloud providers, not considering that a contract between the client and cloud provider must be established to determine a final scope of services, pricing, and service levels. In contrast, the processor 102 described herein may accommodate custom contract terms between the client and the cloud provider in the decision-making policies. Thus, by way of example, in instances in which the processor 102 determines that multiple hosting providers are able to meet the technical characteristics and to comply with the client policies, the processor 102 may select the hosting provider that is able to host the workload at the lowest cost to recommend.

The processor 102 may fetch, decode, and execute the instructions 120 to output the determined infrastructure and the recommended hosting provider. For instance, the processor 102 may output the determined infrastructure and the recommended hosting provider to the client. The client may act on the received recommendation by hiring the recommended hosting provider to host the workload on servers as denoted by the determined infrastructure.

Figure 2:
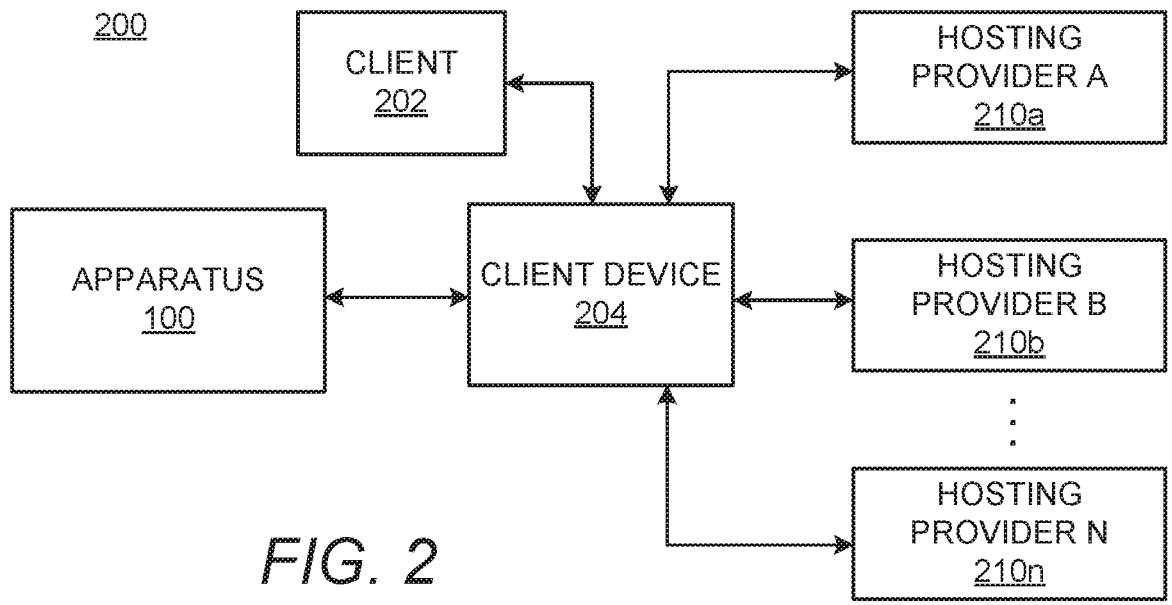
FIG. 2 shows a block diagram of an example environment in which the apparatus depicted in FIG. 1 may be implemented.

With reference now to FIG. 2, there is shown a block diagram of an example environment 200 in which the apparatus 100 depicted in FIG. 1 may be implemented. It should be understood that the environment 200 depicted in FIG. 2 may include additional components and that some of the components described herein may be removed and/or modified without departing from a scope of the environment 200 disclosed herein.

As shown in FIG. 2, a client 202 may communicate with the apparatus 100 via a client device 204. The client device 204 may communicate with the apparatus 100 and the hosting providers 210a-210n over a network, such as a local area network, a wide area network, etc. In particular examples, the apparatus 100 is a cloud-based server and the client device 204 is to communicate with the apparatus 100 over the Internet. Likewise, a hosting provider 210a may be a cloud-based hosting provider and the client device 204 may communicate with the hosting provider 210a over the Internet. In FIG. 2, the variable "n" may represent an integer value that is greater than 1.

As discussed herein, a client 202 may communicate various information, such as the technical characteristics of a workload to be hosted by a hosting provider, client policies, contract terms, etc., to the apparatus 100 through the client device 204. Based upon the various information as well as information pertaining to the technical capabilities of the hosting providers 210a-210n, the apparatus 100 may determine a recommended one of the hosting providers 210a-210n to host the workload for the client. As also discussed herein, the hosting providers 210a-210n from which the apparatus 100 may make this determination may be hosting providers with which the client 202 has contractual agreements in place to perform hosting services for the client 202. The client 202 may be an individual, a business, a corporation, etc.

Figure 3:
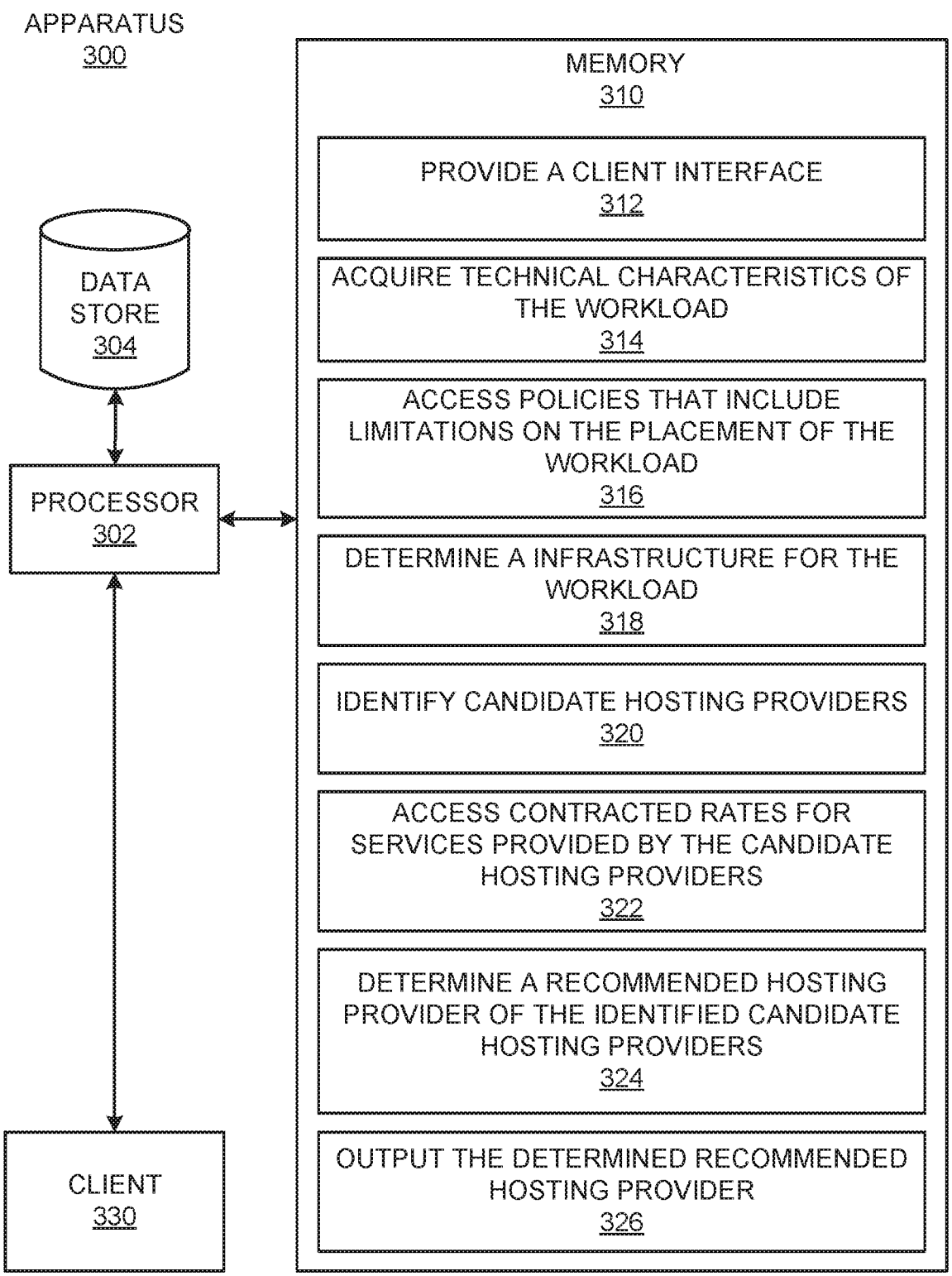
FIG. 3 shows a block diagram of another example apparatus that may determine a recommended hosting provider to host a workload for a client.

With reference now to FIG. 3, there is shown a block diagram of another example apparatus 300 that may determine a recommended hosting provider to host a workload for a client. It should be understood that the apparatus 300 depicted in FIG. 3 may include additional components and that some of the components described herein may be removed and/or modified without departing from a scope of the apparatus 300 disclosed herein. The description of the apparatus 300 is made with reference to the instructions 112-120 in the memory 110 depicted in FIG. 1 and the elements depicted in the block diagram of FIG. 2.

The apparatus 300 may include a processor 302 that may control operations of the apparatus 300 and a data store 304 that may store information that the processor 302 may access. The apparatus 300 may be a computing device such as a server computer, a personal computer, a laptop computer, a smartphone, a tablet computer, or the like. In a particular example, the apparatus 300 is a cloud-based server. The processor 302 may be a semiconductor-based microprocessor, a central processing unit (CPU), an application specific integrated circuit (ASIC), a field-programmable gate array (FPGA), and/or other hardware device. The data store 304 may be an electronic, magnetic, optical, or other physical storage device that contains or stores executable instructions. The data store 304 may be, for example, Random Access memory (RAM), an Electrically Erasable Programmable Read-Only Memory (EEPROM), a storage device, an optical disc, and the like.

The apparatus 300 may also include a memory 310 that may have stored thereon machine readable instructions 312-326 (which may also be termed computer readable instructions) that the processor 302 may execute. The memory 310 may be equivalent to the memory 110.

The processor 302 may fetch, decode, and execute the instructions 312 to provide a client interface through which a client 202 is to input various information that the processor 302 is to use in determining a recommended hosting provider to host the client's 202 workload. The client interface may be a web portal, e.g., a website, a webpage, or the like, that the processor 302 may provide that the client 202 may access via the client device 204. The client interface may include a number of locations into which a client 202 may input the various information, for instance, one or more spreadsheet tables.

The processor 302 may fetch, decode, and execute the instructions 314 to acquire technical characteristics of the workload. The processor 302 may acquire the technical characteristics of the workload in any of the manners discussed above with respect to the instructions 112.

The processor 302 may fetch, decode, and execute the instructions 316 to access policies that include limitations on the placement of the workload. The processor 302 may access the policies in any of the manners discussed above with respect to the instructions 114.

The processor 302 may fetch, decode, and execute the instructions 318 to determine an infrastructure for the workload. The processor 302 may determine the infrastructure, e.g., the type of server, the processing capabilities of a server, the number of servers required, the number and/or type of data storage required, the software to be installed, etc., for the workload in any of the manners discussed above with respect to the instructions 116 in FIG. 1.

The processor 302 may fetch, decode, and execute the instructions 320 to identify candidate hosting providers 210a-210n. As discussed herein, the candidate hosting providers 210a-210n may be hosting providers with which the client 202 has existing contractual agreements to receive hosting services. As also discussed herein, the candidate hosting providers 210a-210n may include some or all of a public cloud-based hosting provider, a managed private cloud (MPC), an information technology operations (ITO) provider, or the like. The client 202 may have contractual agreements with multiple public cloud-based hosting providers, MPC's, ITO's, etc., to host workloads for the client 202.

The processor 102 may identify the candidate hosting providers 210a-210n from information obtained from the client 202 for whom the workload is to be performed. For instance, the client 202 may input the candidate hosting providers 210a-210n through an interface, such as a web-based interface or portal. In addition or in other examples, the identities of the candidate hosting providers 210a-210n may be stored in a database, e.g., on the data store 304, and the processor 302 may access the database to identify the candidate hosting providers 210a-210n.

The processor 302 may fetch, decode, and execute the instructions 322 to access contracted rates for services provided to the client 202 by the candidate hosting providers 210a-210n. The contracted rates may include, for instance, rates for services such as server hosting services, database services, backup services, gateway services, disaster recovery services, etc., that the candidate hosting providers 210a-210n are to charge the client 202. The contracted rates may vary by region, country, location, platform, time of day, or any other variable. The contracted rates may be the rates that have been negotiated and contracted for between the client 202 and the candidate hosting providers 210a-210n and may differ for different ones of the candidate hosting providers 210a-210n. Additionally, the contracted rates may differ from the posted and/or advertised rates of the candidate hosting providers 210a-210n for providing those services.

The processor 302 may also fetch, decode, and execute the instructions 322 to access contracted rates and terms for services provided by support services providers that provide support on behalf of the client 202 with the candidate hosting providers 210a-210n. The support services providers may provide support, such as fixing faults, correcting server faults, implement patches, fixing issues with faults, etc., on the servers of the candidate hosting providers 210a-210n on behalf of the client 202. Thus, instead of the client 202 or the candidate hosting providers 210a-210n performing the support services, the client 202 may have a contractual agreement in place with a support services provider to perform these services. Additionally, the contracted rates for these services may differ for different support services providers and/or for different candidate hosting providers 210a-210n.

In some examples, the contracted rates for the services, e.g., the services provided by the candidate hosting providers 210a-210n and/or the support services providers, may be stored in the data store 304 and the processor 302 may access the contracted rates from the data store 304. For instance, the client 202 may input the contracted rates through a client interface and the processor 302 may store the contracted rates in the data store 304. In other examples, the terms of the contractual agreements may be stored in the data store 304 or other data storage location and the processor 302 may access the contracted rates from the stored contractual agreements.

The processor 302 may fetch, decode, and execute the instructions 324 to determine a hosting provider of the identified candidate hosting providers 210a-210n to recommend to the client 202 to host the workload. Particularly, the processor 302 may determine the hosting provider to recommend to the client 202 to host the workload based upon the determined infrastructure, the accessed policies, the contractual terms in the existing contractual agreements, etc. According to examples, the processor 302 may determine the hosting provider to recommend to the client 202 as the hosting provider of the candidate hosting providers 210a-210n that is able to provide the determined infrastructure, meet the limitations identified in the accessed policies, and provide the lowest negotiated costs to provide the hosting services for the workload to the client 202.

The processor 302 may fetch, decode, and execute the instructions 326 to output an identification of the recommended hosting provider. The processor 302 may output the identification of the recommended hosting provider to a client 330 for whom the recommend hosting provider is to host the workload. Particularly, the processor 302 may output the identification of the recommended hosting provider to the client device 204. The processor 302 may also output the determined infrastructure to the client 330.

Figure 4:
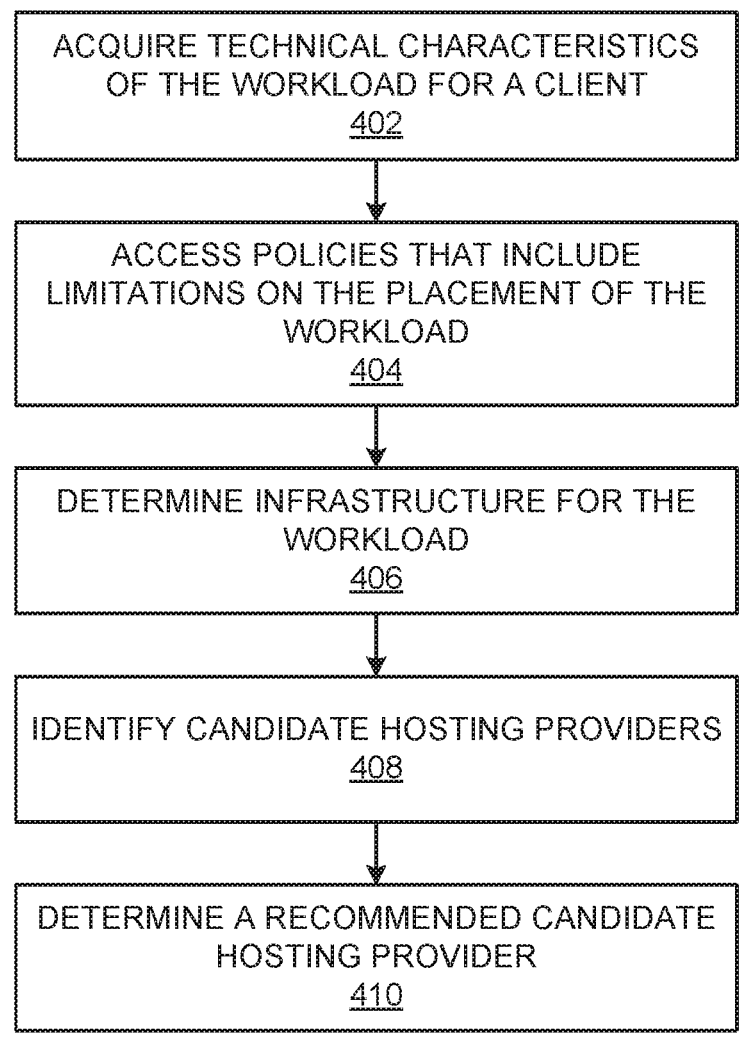
FIGS. 4 and 5, respectively, show flow diagrams of example methods for determining a recommended hosting provider to host a workload for a client.
Figure 5:
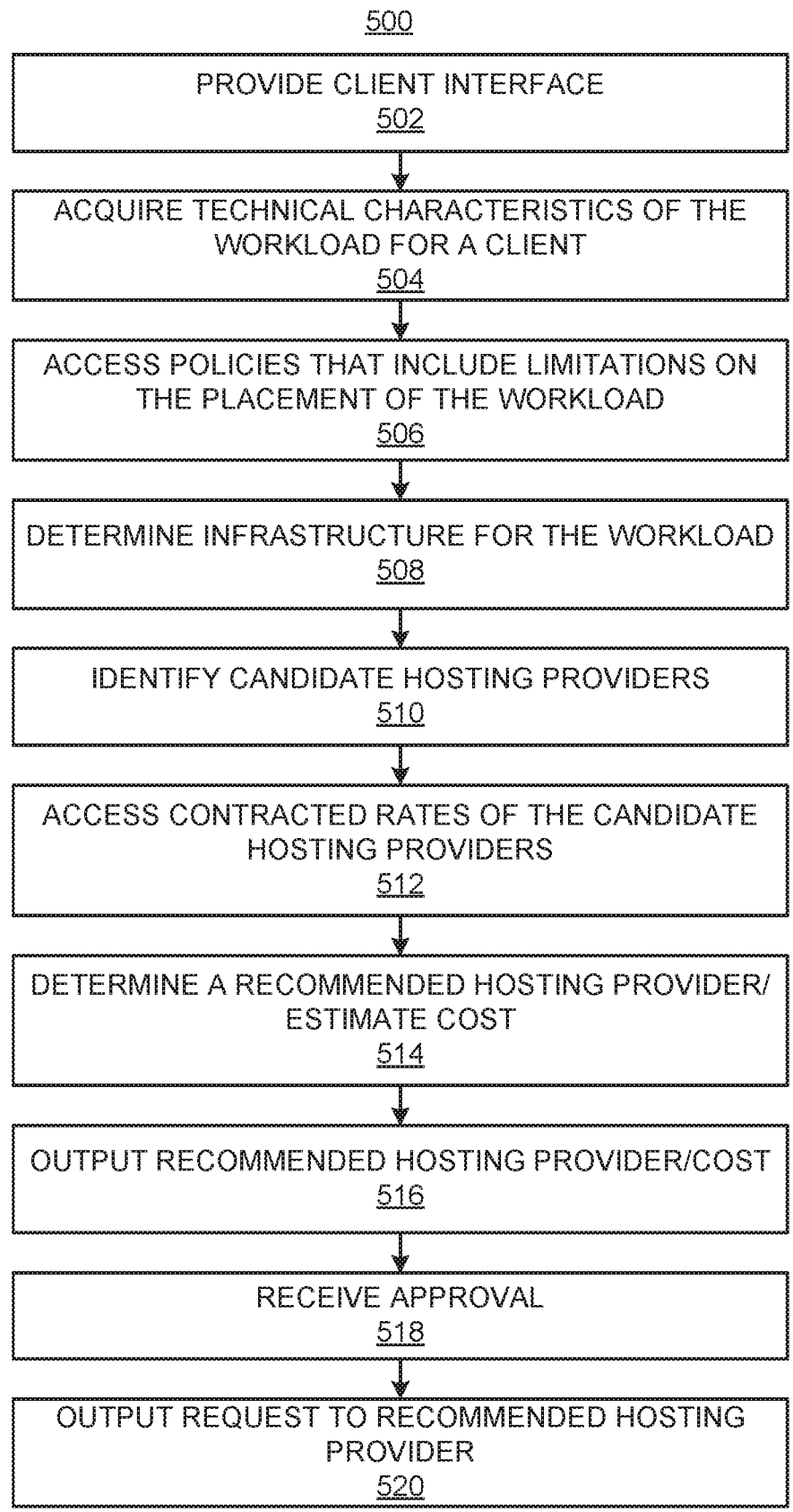

Various manners in which the apparatus 300 may be implemented are discussed in greater detail with respect to the methods 400 and 500 respectively depicted in FIGS. 4 and 5. Particularly, FIGS. 4 and 5, respectively, depict flow diagrams of example methods 400 and 500 for determining a recommended hosting provider to host a workload for a client. It should be understood that the methods 400 and 500 depicted in FIGS. 4 and 5 may include additional operations and that some of the operations described therein may be removed and/or modified without departing from the scopes of the methods 400 and 500. The descriptions of the methods 400 and 500 are made with reference to the features depicted in FIGS. 2 and 3 for purposes of illustration.

With reference first to FIG. 4, at block 402, the processor 302 may execute the instructions 314 to acquire technical characteristics of the workload, for instance, in any of the manners discussed above. At block 404, the processor 302 may execute the instructions 316 to access policies that include limitations on the placement of the workload, for instance, in any of the manners discussed above. At block 404, the processor 302 may access client business policies and technical limitations of the hosting providers 210a-210n. At block 406, the processor 302 may execute the instructions 318 to determine an infrastructure for the workload, for instance, in any of the manners discussed above.

At block 408, the processor 302 may execute the instructions 320 to identify candidate hosting providers 210a-210n to host the workload. As discussed herein, the candidate hosting providers 210a-210n may be hosting providers with which the client 202 has existing contractual agreements to receive hosting services. In addition, at block 410, the processor 302 may execute the instructions 326 to determine a recommended hosting provider from the candidate hosting providers 210a-210n. By way of example, the processor 302 may execute the client business policies before the technical limitations of the hosting providers 210a-210n in determining the recommended hosting provider.

Turning now to FIG. 5, at block 502, the processor 302 may execute the instructions 312 to provide a client interface. The client interface may be provided on a client device 204, for instance, as a webpage or as another screen through which a client 202 may input information concerning a workload for the client 202. According to examples, the processor 502 may provide the client interface to include the display of one or more tables, e.g., spreadsheet tables, into which a client 202 may input various information and may update or change various information. For instance, a client 202 may input information pertaining to the technical characteristics of a workload that the client 202 seeks to have hosted. In these examples, the processor 502 may enable clients 202 to input requirements for new workloads and to save those requirements for further updating and evaluation at a later time. The client 202 may update the requirements by adding or changing characteristics of the workloads.

At block 504, the processor 302 may execute the instructions 314 to acquire technical characteristics of the workload. The processor 302 may acquire the technical characteristics of the workload from the client 202 via the client interface. For instance, the processor 302 may acquire the technical characteristics of the workload from the one or more tables into which the client 202 may have inputted the technical characteristics of the workload.

At block 506, the processor 302 may execute the instructions 316 to access policies that include limitations on the placement of the workload as discussed above. The policies may include client business policies and technical limitations of the hosting providers 210a-210n. For instance, the client 202 may input the client business policies through the client interface on the client device 204 and the processor 302 may determine the technical limitations of the hosting providers 210a-210n from information contained in a database. By way of particular example, the client business policies and the technical limitations of the hosting providers 210a-210n may be inputted into the one or more tables.

At block 508, the processor 302 may execute the instructions 318 to determine a infrastructure for the workload. As discussed above, the processor 302 may determine the infrastructure for the workload based upon the acquired technical characteristics of the workload. For instance, the processor 302 may access the information contained in the one or more tables to determine the infrastructure for the workload. In addition, the information contained in the one or more tables, such as options for operating system, disk size, system size, cost estimation, etc., may be adjusted through updating of the information contained in the one or more tables.

At block 510, the processor 302 may execute the instructions 320 to identify candidate hosting providers 210a-210n. As discussed above, the candidate hosting providers 210a-210n may be those hosting providers with which the client 202 has existing contractual agreements to be able to receive hosting services. At block 512, the processor 302 may execute the instructions 322 to access contracted rates for services provided to the client 202 by the candidate hosting providers 210a-210n under the terms of their contractual agreements. The client 202 may input the identities of the candidate hosting providers 210a-210n and the contracted rates for services through the client interface. In addition or in other examples, the identities of the candidate hosting providers 210a-210n and the contracted rates for services may be stored in a data storage location such as the data store 304, and the processor 302 may access the data storage location for that information. The processor 302 may also access terms of contractual agreements that the client 202 may have with a support services provider at block 512. In the examples discussed above, the various information pertaining to the candidate hosting providers 210a-210n, the contracted rates, etc., may be stored in the one or more tables and the processor 302 may access the information contained in the one or more tables to perform blocks 510 and 512.

At block 514, the processor 302 may determine a recommended hosting provider to host the workload for the client 202 from the candidate hosting providers 210a-210n. As discussed above, the processor 302 may determine the recommended hosting provider based upon the determined infrastructure, the accessed policies, the contractual terms in the existing contractual agreements, etc. According to examples, the processor 302 may determine the hosting provider to recommend to the client 202 as the hosting provider of the candidate hosting providers 210a-210n that is able to provide the determined infrastructure, meet the limitations identified in the accessed policies, and provide the lowest negotiated costs for hosting the workload for the client 202. In addition, or in other examples, the processor 302 may determine the hosting provider to be a hosting provider of the candidate hosting providers 210a-210n that is able to provide the determined infrastructure, meet the limitations identified in the accessed policies, provide the lowest negotiated costs for hosting the workload for the client 202, and for which the client 202 has a lowest cost with a support services provider.

According to examples, the one or more tables may include the upper and lower limits of the hosting providers 210a-210n and the processor 302 may factor that information in determining a recommended hosting provider at block 514. The processor 302 may enforce the policies or rules by evaluating the upper and lower limits of the hosting providers 210a-210n in the one or more tables to determine outcomes, e.g., determine the recommended hosting provider that satisfies the policies or rules. For instance, the client policies may have conditions such as "is" and "is not," which may also be maintained in the one or more tables and may be updated as required. These logical evaluators may determine the outcome of the processor's 302 determination without requiring re-coding of the apparatus 300. As the one or more tables may include most if not all of the information that the processor 302 may access in determining the recommended hosting provider, the determination of the recommended hosting provider may be varied by modifying the information contained in the one or more tables. In this regard, changes to the decision making by the processor 302 may be made on an as-needed basis without requiring coding of the apparatus 300.

Additionally, at block 514, the processor 302 may access the instructions 322 to estimate a cost for the recommended hosting provider to host the client workload based upon the contracted rates for services provided to the client by the recommended hosting provider. The contracted rates, e.g., which may be negotiated rates for the services, may vary by region, country, regulatory limitations, location, time of day, type of workload, support hours required, workload platform, size of the platform, etc.

At block 516, the processor 302 may output the determined hosting provider that the processor 302 has recommended to host the workload for the client 202. The processor 302 may also output the estimated cost for the recommended hosting provider to host the client workload. For instance, the processor 302 may output an identification of the determined hosting provider to the client 202. The processor 302 may also output the infrastructure for the workload determined at block 508. The client 202 may use this information to hire the recommended hosting provider to host the workload on the determined infrastructure. In other examples, the processor 302 may also output the estimated cost for the recommended hosting provider to the client 202 for their review and acceptance. This information may be sent along multiple levels of managerial approval at the client 202, and the client 202 may determine whether to approve of the cost and the recommended hosting provider based upon any of technical, financial, etc., considerations. The estimated cost may not be a binding quote depending upon the implementation of the apparatus 300 and terms of use of the apparatus 300.

At block 518, the processor 302 may receive an approval to proceed with the recommended hosting provider and the estimated cost. In addition, at block 520, the processor 302 may output a request to the recommended hosting provider to host the client workload.

According to examples, the processor 302 may display a status of the client's 202 request for a recommendation of a hosting provider to host a client workload from the initial request, through the determination of the recommended hosting provider and the estimation of the cost, and until the workload has been hosted by a hosting provider.

Some or all of the operations set forth in the methods 400 and 500 may be contained as utilities, programs, or subprograms, in any desired computer accessible medium. In addition, the methods 400 and 500 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
    a processor; and
    a memory on which is stored machine readable instructions to cause the processor to:
        maintain a table that includes options for technical characteristics of a client workload, limitations of one or more hosting providers, and client policies that are received from a client;
        acquire, from the table, technical characteristics of the client workload to be hosted on a hosting provider, wherein the technical characteristics of the client workload include a type of data contained in the client workload, the type of data including a trade secret;
        access, from the table, client policies;
        determine an infrastructure to implement the client workload by accessing information in the table, wherein the client workload includes the trade secret;
        determine, based upon the determined infrastructure and the accessed client policies, a recommended hosting provider that is to host the client workload;
        output the determined infrastructure and the recommended hosting provider;
        update the table upon receiving changes to any of the options for the technical characteristics of the client workload, the limitations of the one or more hosting providers, and the client policies change; and
        access information in the updated table to determine the recommended hosting provider.

2. The apparatus according to claim 1, wherein the instructions are to cause the processor to determine the recommended hosting provider from candidate hosting providers, wherein the candidate hosting providers comprise hosting providers with which the client has existing contractual agreements, wherein the instructions are further to cause the processor to access contract terms between the client and the candidate hosting providers, and wherein to determine the recommended hosting provider, the instructions are further to cause the processor to determine the recommended hosting provider while complying with the accessed contract terms.

3. The apparatus according to claim 2, wherein the instructions are further to cause the processor to access contracted rates for services provided to the client by the candidate hosting providers under the contract terms and wherein to determine the recommended hosting provider, the instructions are further to cause the processor to determine the recommended hosting provider based upon the accessed contracted rates.

4. The apparatus according to claim 3, wherein the instructions are further to cause the processor to:
    estimate a cost for the recommended hosting provider to host the client workload based upon the contracted rates for services provided to the client by the recommended hosting provider;
    output the estimated cost for approval to proceed; and
    in response to receipt of an approval to proceed, output a request to the recommended hosting provider to host the client workload.

5. The apparatus according to claim 2, wherein the instructions are further to cause the processor to access contract terms between the client and a support services provider that is to provide support services for the client with the candidate hosting providers, wherein the accessed contract terms between the client and the support services provider include contracted rates that the client is to pay the support services provider, and wherein to determine the recommended hosting provider, the instructions are further to cause the processor to determine the recommended hosting provider based upon the accessed contract terms.

6. The apparatus according to claim 2, wherein to determine the recommended hosting provider, the instructions are further to cause the processor to determine a hosting provider from the candidate hosting providers that is able to provide the determined infrastructure while meeting provisions identified in the accessed client policies.

7. The apparatus according to claim 1, wherein to acquire the technical characteristics of the client workload, the instructions are further to cause the processor to provide an interface through which a client is to input the technical characteristics of the client workload.

8. The apparatus according to claim 1, wherein the instructions are further to cause the processor to maintain a table that includes options for technical aspects of the client workload, limitations of service providers, and the client policies, wherein the processor is to update the table as changes to any of the options for technical aspects of the client workload, limitations of the service providers, and the client policies change, and wherein the processor is to access information in the table to determine the recommended hosting provider.

9. The apparatus according to claim 8, wherein the table is accessible by the client and wherein the instructions are further to cause the processor to receive input from the client and update the information in the table according to the received input.

10. The apparatus according to claim 2, wherein the candidate hosting providers include at least two of a public cloud-based hosting provider, an information technology operations (ITO) provider, and a managed private cloud (MPC) provider.

11. A method comprising:
  maintaining a table that includes options for technical characteristics of a client workload, limitations of one or more hosting providers, and policies that are received from a client;
  acquiring, from the table, the technical characteristics of the client workload to be hosted on a hosting provider for the client, wherein the technical characteristics of the client workload include a type of data contained in the client workload, the type of data including a trade secret;
  accessing, from the table, policies that include limitations on placement of the client workload;
  determining, by a processor, an infrastructure to implement the client workload by accessing information in the table, wherein the client workload includes the trade secret, and further wherein the determined infrastructure is to perform the client workload according to the technical characteristics while meeting the limitations included in the accessed policies;
  identifying, by the processor, candidate hosting providers that have existing contractual agreements to provide hosting services to the client by accessing information in the table;
  determining, by the processor, based upon the determined infrastructure, the accessed policies, and contractual terms in the existing contractual agreements, a hosting provider of the identified candidate hosting providers that is recommended to host the client workload;
  updating the table upon receiving changes to any of the options for the technical characteristics of the client workload, the limitations of the one or more hosting providers, and the policies change; and
  accessing information in the updated table to determine the recommended hosting provider.

12. The method according to claim 11, further comprising:
  accessing contracted rates for services provided to the client by the candidate hosting providers under contract terms; and
  wherein determining the recommended hosting provider further comprises determining the recommended hosting provider from the candidate hosting providers to be the hosting provider that is able to provide the determined infrastructure while meeting the limitations in the accessed policies and the contractual terms, and while providing the lowest contracted rates.

13. The method according to claim 11, further comprising:
  maintaining a table that includes options for technical aspects of the client workload, limitations of the service providers, and the client policies;
  updating the table as changes to any of the options for technical aspects of the client workload, limitations of the service providers, and the client policies change, and
  access information in the table to determine the recommended hosting provider.

14. A non-transitory computer readable medium on which is stored machine readable instructions that when executed by a processor, cause the processor to perform operations comprising:
  maintain a table that includes options for technical characteristics of a client workload, limitations of one or more hosting providers, and policies that are received from a client;
  acquire, from the table, technical characteristics of the client workload to be hosted on a hosting provider, wherein the technical characteristics of the client workload include a type of data contained in the client workload, the type of data including a trade secret;
  access, from the table, policies that identify restrictions on placement of the client workload;
  determine an infrastructure to host the client workload based on the client workload by accessing information in the table, where the client workload includes the trade secret, wherein the determined infrastructure is to host the client workload according to the technical characteristics while meeting the restrictions included in the accessed policies;
  identify candidate hosting providers with which the client has existing contractual agreements to provide hosting services by accessing information in the table;
  determine, based upon the determined infrastructure, the accessed policies, and contractual terms in the existing contractual agreements, a hosting provider from the identified candidate hosting providers upon which the client workload is recommended to be placed;
  update the table upon receiving changes to any of the options for the technical characteristics of the client workload, the limitations of the one or more hosting providers, and the policies change; and
  access information in the updated table to determine the recommended hosting provider.

15. The non-transitory computer readable medium according to claim 14, wherein the instructions are further to cause the processor to:
  access contracted rates for services provided to the client by the candidate hosting providers under contract terms; and
  wherein to determine the recommended hosting provider, the recommended hosting provider is determined as the hosting provider of the candidate hosting providers that is able to provide the determined infrastructure while meeting limitations in the accessed policies and the contractual terms, and while providing the lowest contracted rates.

16. The apparatus according to claim 1, wherein the technical characteristics associated with the client workload further include at least one of:
  an identification of a country from which users are to access the client workload,
  a location of a user including an identification of a country from which users are to access the client workload,
  a type of a user including at least one of a consumer or a business,
  a type of data contained in the client workload associated with at least one of personably identifiable data, or financial data, or
  an environment in which the client workload is to be used including at least one of a production environment or a development environment, and the instructions further cause the processor to:
    determine the infrastructure to implement the client workload based further on the client workload being associated with the technical characteristics other than the type of data including the trade secret.

17. The method according to claim 11, wherein the technical characteristics associated with the client workload further include at least one of:
  an identification of a country from which users are to access the client workload, a location of a user including an identification of a country from which users are to access the client workload,
a type of a user including at least one of a consumer or a business,
a type of data contained in the client workload associated with at least one of personably identifiable data, or financial data, or
an environment in which the client workload is to be used including at least one of a production environment or a development environment, the method further comprising:
determining the infrastructure to implement the client workload based further on the client workload being associated with the technical characteristics other than the type of data including the trade secret.

18. The non-transitory computer readable medium according to claim 14, wherein the technical characteristics associated with the client workload further include at least one of:
an identification of a country from which users are to access the client workload,
a location of a user including an identification of a country from which users are to access the client workload,
a type of a user including at least one of a consumer or a business,
a type of data contained in the client workload associated with at least one of personably identifiable data, or financial data, or
an environment in which the client workload is to be used including at least one of a production environment or a development environment, and
the instructions further cause the processor to:
determine the infrastructure to implement the client workload based further on the client workload being associated with the technical characteristics other than the type of data including the trade secret.

\* \* \* \* \*